June 19, 1962 C. J. BRADLEY 3,039,494
PIPE PLUG
Filed Oct. 26, 1956
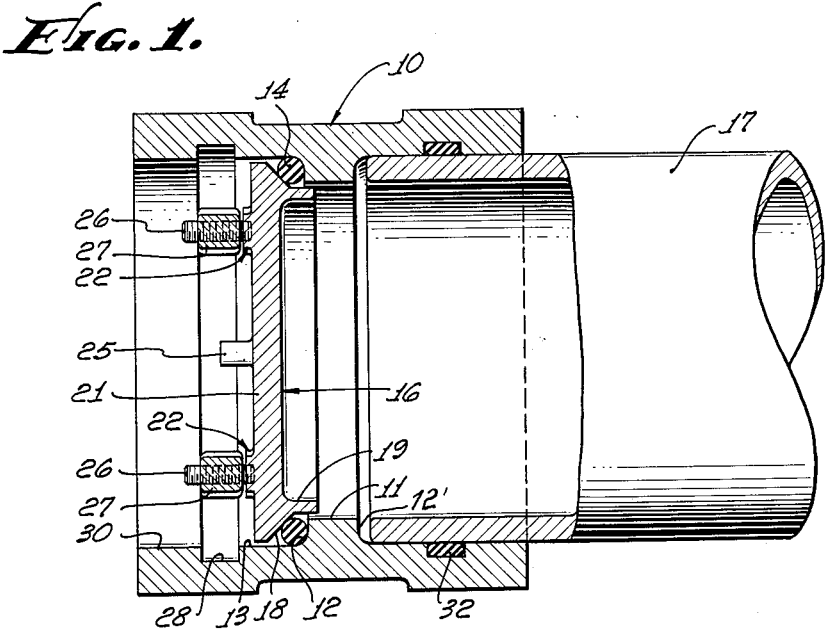
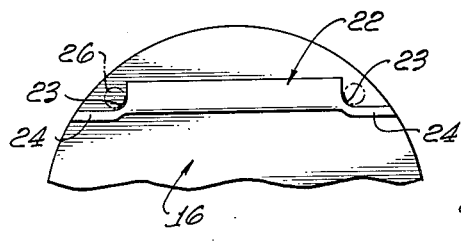
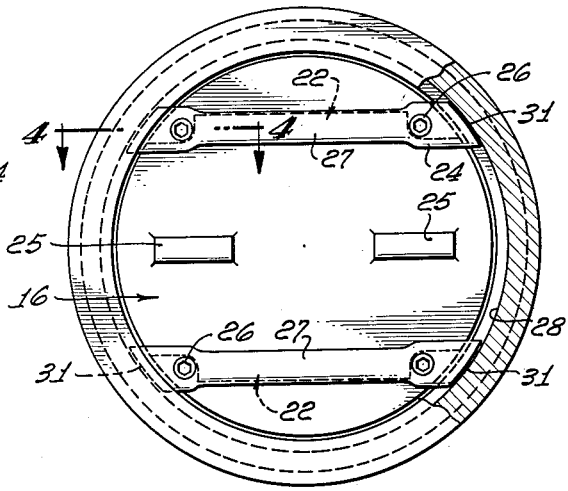
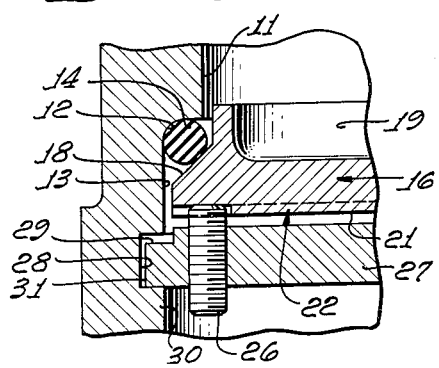
CHARLES J. BRADLEY
INVENTOR.
Huebner, Beehler, Worrel & Herzig.
BY
ATTORNEYS.

United States Patent Office 3,039,494
Patented June 19, 1962

3,039,494
PIPE PLUG
Charles J. Bradley, Los Angeles, Calif.
(1171 Lake Terrace, Fullerton, Calif.)
Filed Oct. 26, 1956, Ser. No. 618,603
2 Claims. (Cl. 138—89)

This invention relates to a removable plug for a conduit, and particularly an underground water pipe which may be unplugged and extended at some future time.

The provision of a temporary or removable plug for conduit and pipe of various types presents a difficult problem because the plug should satisfy many requirements. The plug should be efficient and compact in construction. It should consist of a minimum number of parts capable of being rapidly installed on a pipe or conduit without the use of special tools to make a tight, leak-proof closure.

Furthermore, the plug should be designed to avoid sticking in position because of corrosion, rusting tight, or other chemical action. Thus the plug should be positive and secure in operation as to its installation, its leak-proof plugging qualities, and its removability without the necessity of expansive cutting and threading or replacement operations.

Accordingly, it is an important object of my invention to provide a pipe or conduit plug consisting of a minimum number of parts designed for rapid and convenient installation and removal without the use of special tools.

Another object is to provide such a plug of compact and efficient construction designed for economical fabrication and capable of making a secure, leak-proof closure which can be reopened at some future time without expensive cutting or replacement operations.

A further object is to provide a plug of this type designed to make a safe, secure closure in a corrosive environment without the danger of rusting, corroding or sticking tightly in place on pipe such as underground water pipe, for example.

Additional objects will become apparent from the following description.

Stated in general terms, my invention comprehends the provision of a pipe or conduit plug comprising a fitting means adapted for mounting on a conduit or pipe line. The fitting means preferably is a T, sleeve, cross, elbow, or the like, threadedly engaged on an end of a length of conduit. A resilient ring means such as a rubbery O-ring is seated in the fitting means in a seat portion, preferably formed adjacent an opening in the fitting means.

Plug means adapted for seating on the ring means to make a tight, leak-proof seal therewith is provided of outside dimensions preferably somewhat less than the inside dimensions of the fitting means to avoid continuous, tight engagement of the plug means with the fitting means. The purpose of these comparative dimensions is to avoid sticking, rusting or corroding tight of the plug means in the fitting means.

Removable brace or pressure means are included to urge or force the plug means against the ring means under a desired degree of pressure to make the appropriate seal described above. Screw means threadedly meshed in the brace means and bearing against the plug means preferably are used for this purpose. The brace means in turn are firmly held in position in suitable groove means formed in the fitting means.

A more detailed description of a specific embodiment of my invention is given with reference to the drawing, wherein:

FIGURE 1 is a vertical sectional view showing a pipe plug mounted in a pipe sleeve;

FIGURE 2 is an end view of the pipe plug and sleeve shown in FIGURE 1;

FIGURE 3 is a partial view showing positioning means on the outside surface of the plug means; and FIGURE 4 is a partial cross-sectional view drawn to a somewhat enlarged scale showing the relationship between the sleeve, ring, plug and brace means.

It will be understood that although the specific embodiment of my invention shown in the drawing is applied to a sleeve 10 mounted on the end of a length of water pipe, it can be applied to any other desired standard fitting means such as a T, cross, elbow, etc., as well as to a special fitting made particularly to receive the plug assembly. The invention also can be applied to oil pipe lines, gas pipe lines and other types of pipe or conduit, as will be readily understood after reading the description given below.

The sleeve 10 or other fitting means described above, is provided with an annular internal flange or shoulder 11 having an annular curved portion 12 at the junction between the inside wall 13 of the fitting with the adjacent wall of the flange. A resilient ring 14, such as an O-ring made of a natural or synthetic rubbery material, is made of suitable radius and cross sectional shape and dimensions to seat snugly in the annular curved portion or seat 12 of the fitting.

An annular or generally disc-shaped plug 16, having a somewhat smaller outside diameter than the diameter of inside wall 13 of the fitting is seated on the O-ring 14 so that the plug is in floating relationship with the inside walls of the fitting. That is, the plug is not in engagement with the fitting and is sufficiently spaced therefrom to avoid sticking, rusting, or corroding tight to the fitting. Slight movement of the plug, caused by pressure changes in the water, or other fluid, in the pipe 17, also tend to avoid seizure between the plug and the fitting.

The plug 16 preferably is provided with an annular tapered portion 18 between an inner annular section 19, and a cap portion 21. The inner section 19 is of reduced diameter somewhat less than the inside diameter of flange 11 to avoid seizure of the plug in the flange, as described above. The purpose of the section 19 is to assist in centering the plug in the fitting bell or opening and in precisely seating the plug portion 18 in the inner annular surface of the O-ring 14.

Cap portion 21 of the plug, as pointed out above, is made of somewhat smaller diameter than the diameter of inside wall 13 to insure against the plug rusting or corroding tight. The diameter of cap 21 is, however, made large enough to retain ring 14 secured seated and to avoid slippage of the plug through the ring.

The exposed surface of cap 21 is provided with two positioning ribs 22 raised on the surface of the cap. The positioning ribs are generally parallel to each other and are curved at 23 to form retaining walls 24, for screws 26. Screws 26 can be set screws with recessed drives, as shown, or the screws can be provided with heads having flattened sides for engagement by conventional wrenches.

Two screws 26 are threadedly mounted in each of two pressure bars or braces 27. The pressure bars are made shorter in diameter than that of the inside wall 13. They are positioned generally parallel to each other with the set screws 26 thereof held in position and prevented from moving toward the center of the cap 21.

The ends of the pressure bars 27 are dimensioned to conveniently fit into inner annular groove 28 formed in the inside wall 13. However, the pressure bars are made thick enough to safely apply the desired pressure to plug 16 and preferably are reduced somewhat at 29 to fit into the groove 28. The groove 28 is provided with a sufficient outer annular shoulder 30 to withstand the outwardly directed pressure safely. The pressure bars also preferably are curved at 31 on their ends with a curvature substantially equal to that of groove 28 and with about the same radius as the groove so that the ends of the bars can be snugly fitted into the groove.

The plug 16 is mounted in fitting 10 by inserting resilient ring 14 therein and seating it in seat 12. Plug 16 is grasped at ears 25 formed therein and is inserted in the opening in the fitting with inner section 19 directed inwardly and then inserted through ring 14 into inner annular flange 11. Each of the pressure bars 27 is positioned with its ends in groove 28 and the curved portion 31 coinciding with the groove. The set screws 26 of each bar also are positioned on the outer side of the retaining walls 24 which prevent the set screws and bars from moving inwardly. The set screws then are tightened evenly to the desired degree with a suitable wrench to apply an even degree of sealing pressure on sealing ring 14. The fluid pressure in the fitting is sealed and retained by the compressed sealing ring.

When it is desired to remove the plug 16, at some future time, the set screws 26 are sufficiently loosened with the aid of a wrench. Each of the pressure bars 22 is dislodged at screws 26 from the retaining walls 24 and moved inwardly toward the center of the cap until the ends of the bars are free of groove 28. The bars are then removed and plug 16 is removed from seating engagement with ring 14 by simply grasping the ears 25 and withdrawing the plug from the opening or bell of the fitting 10.

A pipe or conduit section, such as section 17, can then be connected into the sleeve 10, or other fitting such as a T, cross, elbow, etc. This is done, for example, by placing an O-ring 32 in groove 28 and forcing the pipe or conduit section through the O-ring until the end of the section engages flange 11 at seat 12'.

The pipe plug 16 and fitting 10 have been described above as made of metal. It will be understood, however, that either, or both of these elements can be made of non-metallic materials such as plastic materials, glass, Transite, ceramic materials, etc.

Two pressure bars 27 have been shown, but it will be apparent that three or more similar bars or braces can be used. Bars or brace means of configuration other than that of bar-shape also are contemplated as being within the scope of my invention.

While I have herein shown and described my invention in what I have conceived to be the most practical and preferred embodiment, it is recognized that departures can be made therefrom within the scope of my invention, which is not to be limited to the details disclosed herein, but is to be accorded the full scope of the claims so as to embrace any and all equivalent structure.

Having described my invention, what I claim as new and desire to secure by Letters Patent is:

1. A pipe plug assembly comprising a tubular fitting adapted to receive the end portion of a pipe having an external diameter approximately equal to the internal diameter of the fitting, said fitting including an internal annular rib intermediate the ends thereof one face of said rib adapted to lie adjacent the end of the pipe and the opposite face of the rib presenting an annular seat for an O-ring, said annular seat having an arcuate cross section, a resilient O-ring seated in said annular seat, an imperforate plug including guide means projecting from a first face thereof into the bore defined by said rib for axially positioning said plug, an annular tapered shoulder on said plug to engage said ring, an upper and lower pair of recesses in a second face of said plug for receiving pressure exerting screws, an internal annular groove in said fitting spaced from said annular seat, a pair of elongate braces inserted in said groove in parallel relationship to each other and aligned with said upper and lower pair of recesses respectively, screws threadably mounted in said braces and engaging the surfaces of said recesses creating pressure on said plug and urging said annular tapered shoulder of said plug against said O-ring and said annular seat.

2. A pipe plug assembly comprising a tubular fitting adapted to receive the end portion of a pipe having an external diameter approximately equal to the internal diameter of the fitting, said fitting including an internal annular rib intermediate the ends thereof one face of said rib adapted to lie adjacent the end of the pipe and the opposite face of the rib presenting an annular seat for an O-ring, said annular seat having an arcuate cross section, a resilient O-ring seated in said annular seat, a flat imperforate disk plug including an extension guide projecting from a first face thereof into the bore defined by said rib for axially positioning said plug, said guide having a diameter approximately equal to the diameter of the annular rib, an annular tapered shoulder on said plug to engage said ring, pressure receiving means in a second face of said plug for receiving pressure exerting screws, an internal annular groove in said fitting spaced from said annular seat, a pair of elongate braces inserted in said groove in parallel relationship to each other and aligned with said pressure receiving means, screws threadably mounted in said braces and engaging the pressure receiving means creating pressure on said plug and urging said annular tapered shoulder of said plug against said O-ring and said annular seat.

References Cited in the file of this patent

UNITED STATES PATENTS

| | | |
|---|---|---|
| 208,292 | Carroll | Sept. 24, 1878 |
| 443,952 | Baguley | Dec. 30, 1890 |
| 969,776 | Faley | Sept. 13, 1910 |
| 1,250,603 | Loepsinger | Dec. 18, 1917 |
| 1,592,382 | Munn | July 13, 1926 |
| 2,146,641 | McWane | Feb. 7, 1939 |
| 2,465,727 | Jensen | Mar. 29, 1949 |
| 2,743,034 | Wheatly | Apr. 24, 1956 |

FOREIGN PATENTS

| | | |
|---|---|---|
| 337,470 | France | Oct. 15, 1904 |
| 796,050 | France | Jan. 17, 1936 |